United States Patent
Terwilliger et al.

(10) Patent No.: US 9,699,023 B2
(45) Date of Patent: Jul. 4, 2017

(54) INITIALIZING A NETWORK INTERFACE BASED ON STORED DATA

(71) Applicants: David Terwilliger, Richardson, TX (US); Scott Hart, Richardson, TX (US); Cris Villarma, Richardson, TX (US); Eric Siegel, Richardson, TX (US)

(72) Inventors: David Terwilliger, Richardson, TX (US); Scott Hart, Richardson, TX (US); Cris Villarma, Richardson, TX (US); Eric Siegel, Richardson, TX (US)

(73) Assignee: Fujitsu Limited, Kawasaki (JP)

(*) Notice: Subject to any disclaimer, the term of this patent is extended or adjusted under 35 U.S.C. 154(b) by 343 days.

(21) Appl. No.: 14/335,723

(22) Filed: Jul. 18, 2014

(65) Prior Publication Data

US 2016/0020945 A1    Jan. 21, 2016

(51) Int. Cl.
- *G06F 15/177* (2006.01)
- *H04L 12/24* (2006.01)
- *G06F 17/30* (2006.01)
- *H04L 29/06* (2006.01)

(52) U.S. Cl.
CPC .... *H04L 41/0806* (2013.01); *G06F 17/30876* (2013.01); *H04L 65/60* (2013.01)

(58) Field of Classification Search
CPC ...................................................... H04L 67/06
USPC .................................................. 709/222, 224
See application file for complete search history.

(56) References Cited

U.S. PATENT DOCUMENTS

| | | | | |
|---|---|---|---|---|
| 6,072,809 A * | 6/2000 | Agrawal | ........... | H04J 3/0632 370/503 |
| 6,910,053 B1 * | 6/2005 | Pauly | ........... | G06F 17/30374 707/625 |
| 7,167,877 B2 * | 1/2007 | Balogh | ........... | G06F 9/505 707/615 |
| 2011/0107354 A1 * | 5/2011 | Daherkar | ........... | G06F 9/542 719/318 |
| 2012/0254346 A1 * | 10/2012 | Danforth | ........... | H04L 67/06 709/217 |
| 2014/0022997 A1 * | 1/2014 | Xue | ........... | H04W 24/10 370/328 |

* cited by examiner

*Primary Examiner* — David Lazaro
*Assistant Examiner* — Marie Georges Henry
(74) *Attorney, Agent, or Firm* — Baker Botts L.L.P.

(57) ABSTRACT

In accordance with some embodiments of the present disclosure, a method for initializing a network interface comprises monitoring a stream of data sent to a network interface and determining that a provisioning update for the network interface is complete. The method may further comprise sending provisioning data to a local file of the network interface, storing the provisioning data in the local file, and initializing an interface control module of the network interface based on the provisioning data stored in the local file.

16 Claims, 4 Drawing Sheets

INITIALIZING A NETWORK INTERFACE BASED ON STORED DATA

TECHNICAL FILED

The present disclosure relates to communication networks, and more specifically, to initializing a network element.

BACKGROUND

A communication network may include network elements that route packets through the network. Some network elements may include a distributed architecture, wherein packet processing may be distributed among several subsystems of the network element (e.g., line cards). Thus, network elements may be modular and may include various sub-systems and/or sub-elements, which may include a shelf, a slot, a port, a channel and/or various combinations thereof.

After powering on a network element, various sub-systems and/or sub-elements of the network element may be initialized. During initialization, provisioning instructions may be provided to each of the sub-systems and/or sub-elements to control how the sub-systems and/or sub-elements perform various functions (e.g., traffic shaping, quality-of-service control) of the network element. For network elements containing a large amount of sub-systems and/or sub-elements, the amount of provisioning data transferred during an initialization may be very large. Accordingly, the initialization of network elements may take a significant amount of time.

BRIEF DESCRIPTION OF THE DRAWINGS

For a more complete understanding of the present invention and its features and advantages, reference is now made to the following description, taken in conjunction with the accompanying drawings, in which.

SUMMARY

A method for initializing a network interface is disclosed. In accordance with some embodiments of the present disclosure, a method for initializing a network interface comprises monitoring a stream of data sent to a network interface and determining that a provisioning update for the network interface is complete. The method may further comprise sending provisioning data to a local file of the network interface, storing the provisioning data in the local file, and initializing an interface control module of the network interface based on the provisioning data stored in the local file.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
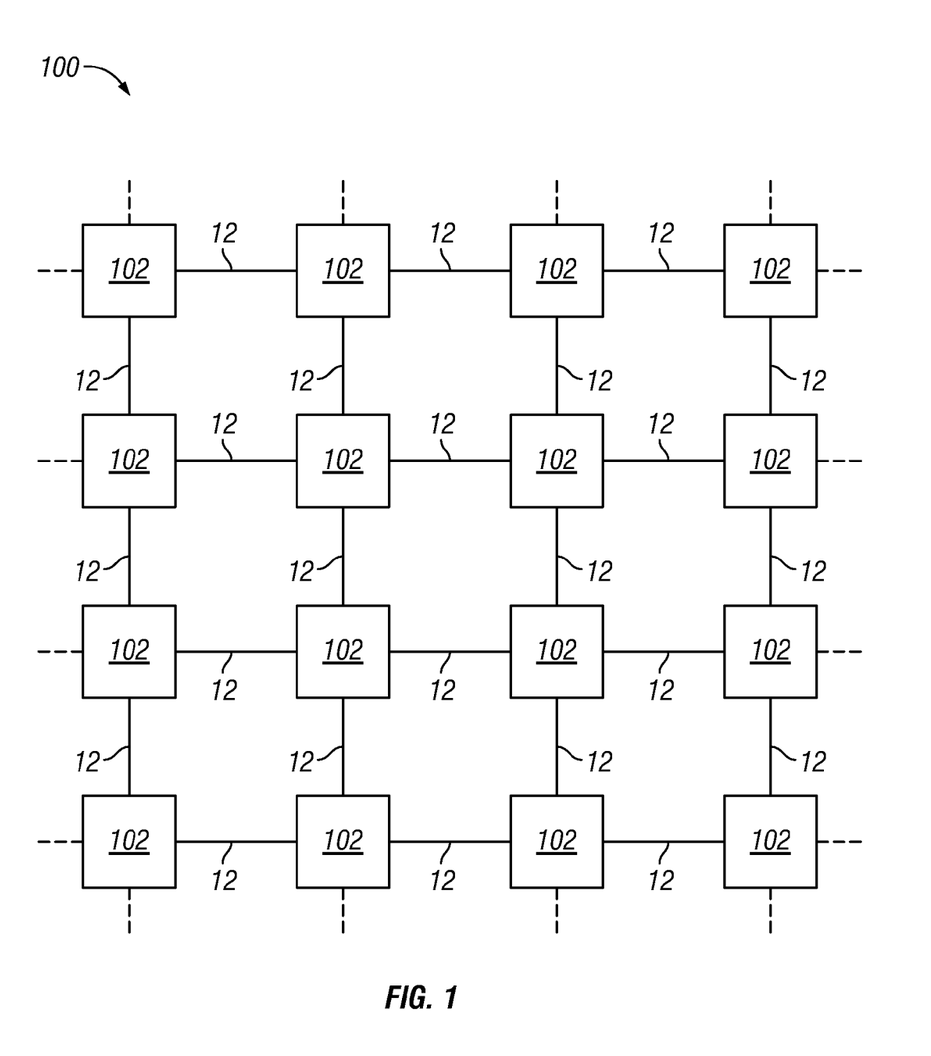
FIG. 1 is a block diagram of selected elements of an example embodiment of a network.

FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

Figure 2:
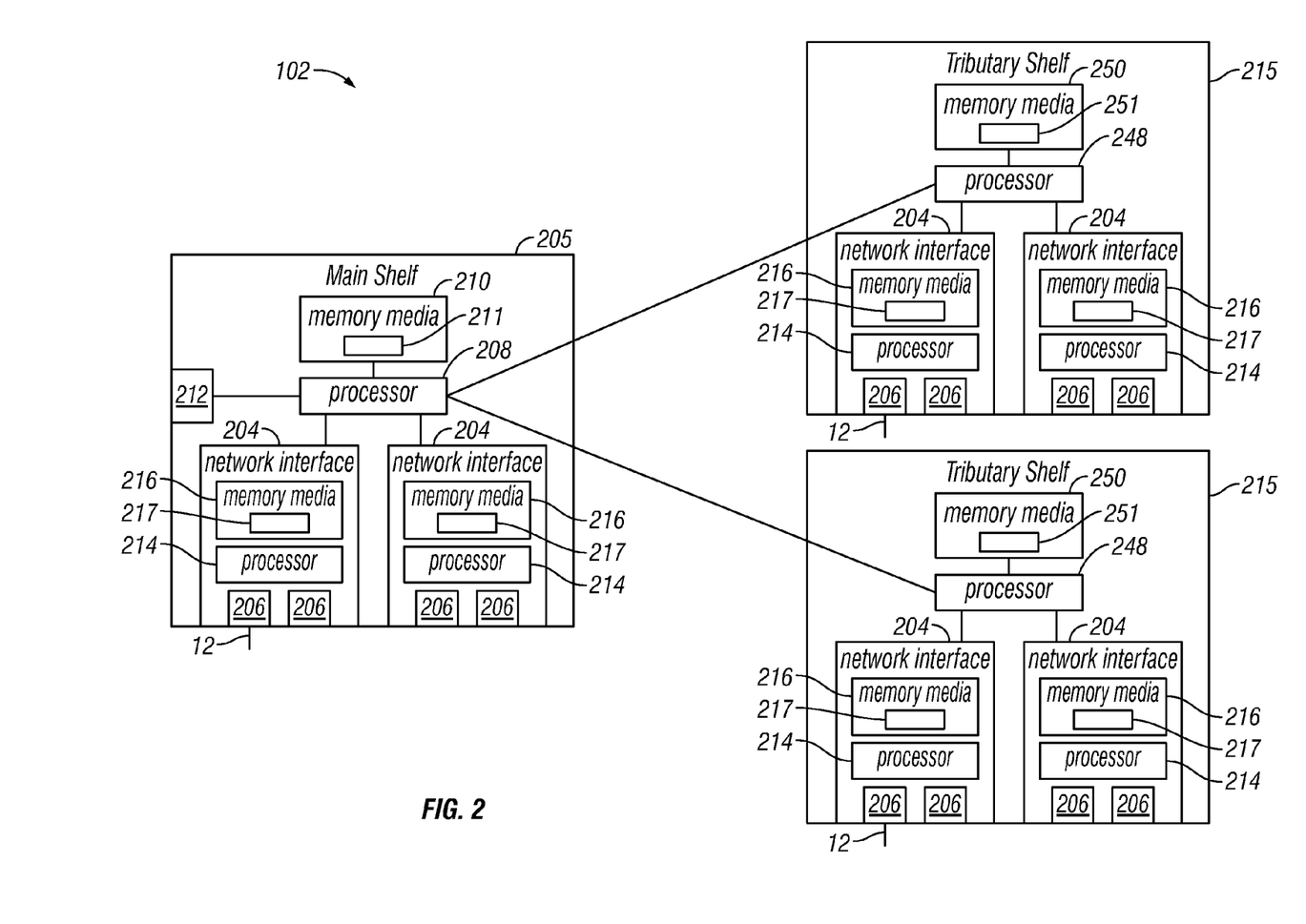
FIG. 2 is a block diagram of selected elements of an example embodiment of a network element.

Referring now to FIG. 2, a block diagram of selected elements of an embodiment of network element 102 is illustrated. Network element 102 may include main shelf 205 and any number of tributary shelves 215. Main shelf 205 may include processor 208, memory media 210, and external port 212. External port 212 may be used by processor 208 to communicate with neighbor network elements (see FIG. 1). Main shelf 205 may also include any number of network interfaces 204, each of which may include one or more ports 206.

As depicted in FIG. 2, main shelf 205 may include processor 208 and memory media 210 that may store instructions executable by processor 208. Processor 208 may include a single processing unit (e.g., a core) or may include multiple processing units (not shown). In certain embodiments, processor 208 may represent a multi-processor subsystem in which each individual processor includes one or more processing units. The individual processors and/or processing units may provide processing resources, such as a processing frequency, messaging, instruction queuing, memory caching, virtual memory, among others, to process instructions and/or code.

Portions of memory media 210 may represent volatile memory, non-volatile memory, or a combination thereof. For example, memory media 210 may include non-volatile memory 211 which may maintain information while main shelf 205 is powered on or off. In some embodiments, non-volatile memory 211 may include provisioning data, which, as described in further detail below with reference to FIG. 3, may be used to initialize one or more interface control modules of a network interface. Memory media 210 may represent fixed, and/or removable media, and may be implemented using magnetic and/or semiconductor memory. Memory media 210 is capable of storing instructions (e.g., code executable by processor 208) and/or data. Memory media 210 and/or at least a portion of contents of memory media 210 may be implemented as an article of manufacture comprising non-transitory computer readable memory media storing processor-executable instructions. Memory media 210 may store instructions including an operating system (OS), which may be any of a variety of operating systems, such as a UNIX variant, LINUX, a Microsoft Windows® operating system, or a different operating system.

As depicted in FIG. 2, some embodiments of network element 102 may include one or more instances of tributary shelf 215 in addition to main shelf 205. For example, network element 102 may include one tributary shelf 215, two tributary shelves 215, or any suitable number of tributary shelves 215 up to and greater than two-hundred tributary shelves 215. Each tributary shelf 215 may include an instance of processor 248 and an instance of memory media 250 that may store instructions executable by processor 248. Processor 248 may include a single processing unit (e.g., a core) or may include multiple processing units (not shown). In certain embodiments, processor 248 may represent a multi-processor subsystem in which each individual processor includes one or more processing units. The individual processors and/or processing units may provide processing resources, such as a processing frequency, messaging, instruction queuing, memory caching, virtual memory, among others, to process instructions and/or code.

Portions of memory media 250 may represent volatile memory, non-volatile memory, or a combination thereof. For example, memory media 250 may include non-volatile memory 251, which may maintain information while tributary shelf 215 is powered on or off. In some embodiments, non-volatile memory 251 may include provisioning data, which, as described in further detail below with reference to FIG. 3, may be used to initialize one or more interface control modules of a network interface. Memory media 250 may represent fixed, and/or removable media, and may be implemented using magnetic and/or semiconductor memory. Memory media 250 is capable of storing instructions (e.g., code executable by processor 248) and/or data. Memory media 250 and/or at least a portion of contents of memory media 250 may be implemented as an article of manufacture comprising non-transitory computer readable memory media storing processor-executable instructions. Memory media 250 may store instructions including an operating system (OS), which may be any of a variety of operating systems, such as a UNIX variant, LINUX, a Microsoft Windows® operating system, or a different operating system.

In FIG. 2, main shelf 205 and tributary shelf 215 are both shown including at least one network interface 204, which provides a plurality of ports 206 that receive a corresponding transmission media 12 (see also FIG. 1). Ports 206 and transmission media 12 may represent galvanic and/or optical network connections. Each network interface 204 may include any suitable system, apparatus, or device configured to serve as an interface between a network element 102 and transmission medium 12. Each network interface 204 may enable its associated network element 102 to communicate with other network elements 102 using any of a variety of transmission protocols and/or standards. Network interface 204 and its various components may be implemented using hardware, software, or any combination thereof. In certain embodiments, network interfaces 204 may include a network interface card. In various embodiments, network interfaces 204 may include a line card. Each port 206 may include a system, device or apparatus configured to serve as a physical interface between corresponding transmission medium 12 and network interface 204. In some embodiments, port 206 may comprise an Ethernet port. Although in FIG. 2 network interfaces 204 are shown with two instances of ports 206 for descriptive clarity, in different embodiments, network interfaces 204 may be equipped with different numbers of ports 206 (e.g., four, six, eight, sixteen ports, etc.).

As shown in FIG. 2, network interface 204 may include memory media 216 and processor 214, which may respectively store and execute instructions and may be implemented in a similar manner as described above with respect to memory media 210 and 250 and processors 208 and 248, respectively. Memory media 216 may include non-volatile memory 217, which may maintain information while network interface 204 is powered on or off. In some embodiments, non-volatile memory 217 may include provisioning data in a local file, which, as described in further detail below with reference to FIG. 3, may be used to initialize one or more interface control modules of network interface 204.

In various embodiments, processor 214 may execute internal instructions and operations, such as for packet routing and forwarding, and may be under control or supervision of processor 208 in main shelf 205 and/or processor 248 in tributary shelf 215. For example, processor 214 within an instance of network interface 204 located in main shelf 205 may operate under control or supervision of processor 208 in the main shelf 205. As another example, processor 214 within an instance of network interface 204 located in tributary shelf 215 may operate under control or supervision of both processor 208 in main shelf 205 and processor 248 in tributary shelf 215.

In various embodiments, network element 102 may be configured to receive data and route such data to a particular network interface 204 and/or port 206 based on analyzing the contents of the data and/or based on a characteristic of a signal carrying the data (e.g., a wavelength and/or modulation of the signal). In certain embodiments, network element 102 may include a switching element (not shown) that may include a switch fabric (SWF).

Figure 3:
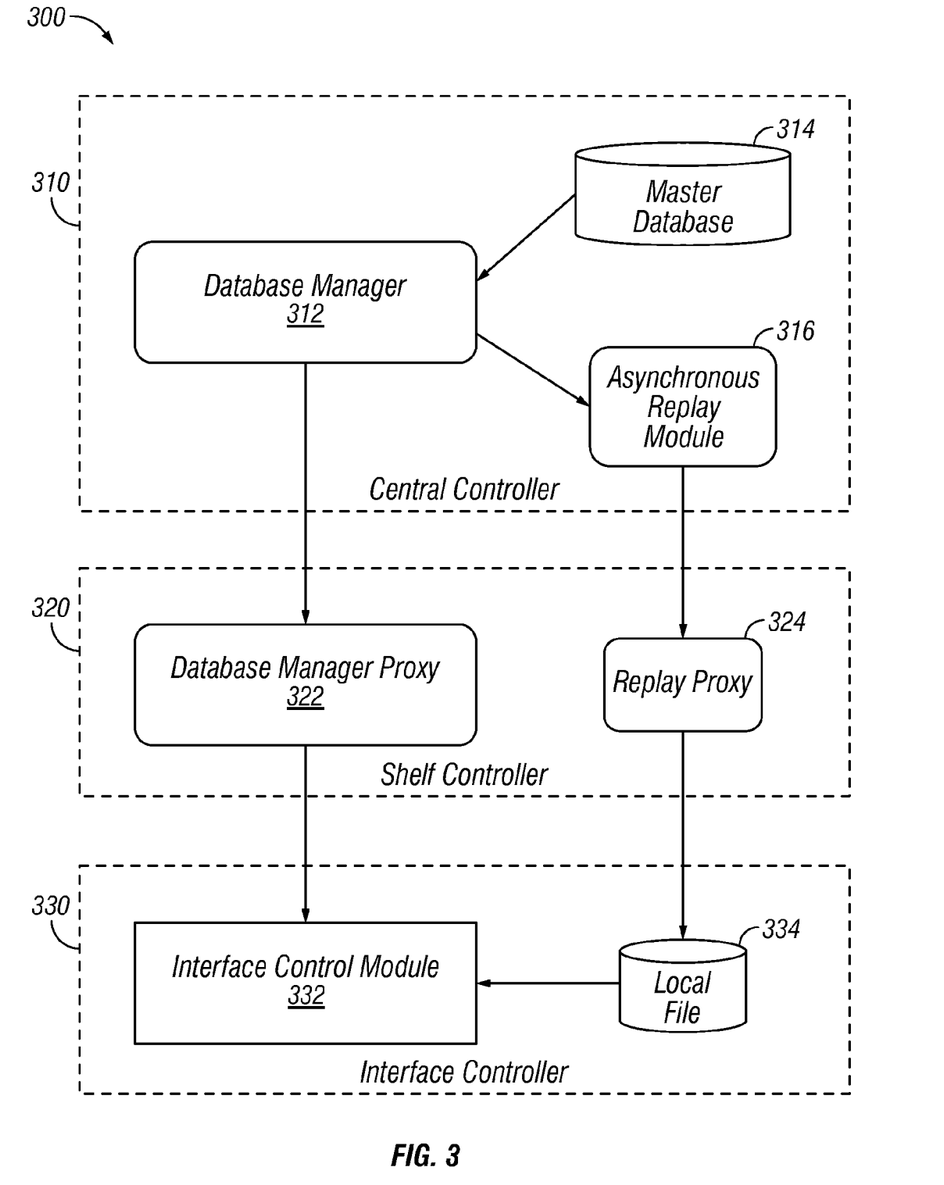
FIG. 3 is a block diagram of selected elements of an example initialization architecture in a network element.

FIG. 3 is a block diagram of selected elements of an example initialization architecture in a network element.

Initialization system 300 may include central controller 310, shelf controller 320, and interface controller 330.

Central controller 310 may include various elements that may be implemented by processor 208 and memory media 210 of main shelf 205, which are depicted in FIG. 2. For example, memory media 210 may include master database 314 and may include instructions that, when executed by processor 208, operate as database manager 312 and asynchronous replay module 316.

Shelf controller 320 may include various elements, which in some embodiments, may be implemented by processor 248 and memory media 250 of tributary shelf 215, which are depicted in FIG. 2. For example, memory media 250 may include instructions that, when executed by processor 248, operate as database manager proxy 322 and replay proxy 324. In some embodiments, elements of shelf controller 320 may be implemented by processor 214 and memory media 216 of a network interface 204, which may be located in either main shelf 205 or tributary shelf 215. For example, memory media 216 may include instructions that, when executed by processor 214, operate as database manager proxy 322 and replay proxy 324.

Interface controller 330 may include various elements that may be implemented by processor 214 and memory media 216 of network interface 204, which may be located in either main shelf 205 or tributary shelf 215, which are depicted in FIG. 2. For example, memory media 216 may include local file 334 and may include instructions that, when executed by processor 214, operate as interface control module 332.

In some embodiments of network element 102, each of multiple network interfaces 204 may include one or more instances of interface control module 332. Each interface control module 332 implemented in a network interface 204 may control one or more operations related to the handling and routing of traffic by that network interface 204. In some embodiments, interface control module 332 may control one or more operations of network interface 204 based on provisioning data distributed by database manager 312.

Database manager 312 may receive provisioning data for the various sub-systems and sub-elements of network element 102 from a user and/or administrator of network element 102. For the purposes of the present disclosure, provisioning data or information may refer to data or information that may control or change the operating state in which a sub-system or sub-element of a network element (e.g., an interface control module 332) functions. Database manager 312 may store the provisioning data in master database 314. The provisioning data may be periodically updated by the user and/or administrator of network element 102 in order to update the functionality of network element 102. Accordingly, database manager 312 may periodically update master database 314.

Master database 314 may include provisioning data for each interface control module 332 in a network element. As described above with reference to FIG. 2, network element 102 may include main shelf 205 and multiple tributary shelves 215, each of which may contain multiple network interfaces 204. And as described above with reference to FIG. 3, each network interface 204 may include multiple interface control modules 332. In some embodiments, master database 314 may include a large amount of provisioning data for the potentially large number of interface control modules 332 included within a single network element 102. Each interface control module 332 may receive its own unique provisioning data from master database 314. Accordingly, each interface control module 332 may receive provisioning data that is a portion of a master set of provisioning information stored in master database 314.

Each time database manager 312 updates the provisioning data stored in master database 314, database manager 312 may also store a tag in master database 314 identifying the updated provisioning data. As discussed in further detail below, the tag may be used to determine whether a locally stored copy of the provisioning data for a particular interface control module 332 is valid or needs to be updated.

During operation of network element 102, a stream of messages may be sent from central controller 310 to interface controller 330. The stream of messages may include various types of data, for example data including, but not limited to, retrieval data and/or provisioning data. In some embodiments, during an initial start-up of network element 102, or after a user update to the provisioning data in master database 314, the streams of messages being sent to instances of interface control module 332 may include provisioning data for the respective interface control modules 332. Such provisioning data may be sent, for example, from database manager 312 to database manager proxy 322, which may in turn relay the provisioning data to interface control module 332.

In some embodiments, central controller 310 may monitor a stream of messages sent from database manager 312 of central controller 310 to interface control module 332 of interface controller 330. If the stream of messages includes provisioning data, central controller 310 may determine that a provisioning update is being applied to interface control module 332. When a provisioning update occurs for a particular instance of interface control module 332, a destination identifier for that instance of interface control module 332 may be queued in asynchronous replay module 316. Asynchronous replay module 316 may include a timer corresponding to the destination identifier, and may count the time from the end of a stream of data sent to the destination (i.e., the particular instance of interface control module 332). When the timer reaches a threshold amount of time (e.g., ten seconds, one minute, ten minutes), asynchronous replay module 316 may determine that the stream of messages to the interface control module 332 has ceased, and that the provisioning change may, at least for the time being, be complete, although further provisioning changes may occur at a later time.

After a provisioning change has finished, a set of provisioning data may be built and a file containing the provisioning data may be stored at a location local to interface control module 332. In some embodiments, the set of provisioning data may be built by asynchronous replay module 316 to exclude non-provisioning data such as the retrieval data that may have been sent along with the provisioning data in the stream of messages from central controller 310 to interface controller 330. The set of provisioning data may also be further optimized to include only the provisioning data that corresponds to a particular instance of interface control module 332. For example, after asynchronous replay module 316 determines that the provisioning change for a particular interface control module 332 is complete, asynchronous replay module 316 may read master database 314 to acquire the provisioning data for that particular interface control module 332. In some embodiments, asynchronous replay module 316 may filter the provisioning data that is associated with the particular interface control module 332 out of a master set of provisioning information in master database 314 corresponding to all instances of interface control module 332 in network element 102. Such filtering may be based on the destination identifier associated with the particular interface control module 332, or based on any other identifier suitable to identify the particular interface control module 332 to which a subset of the provisioning information in master database 314 corresponds. Asynchronous replay module 316 may replay the provisioning data (i.e., send the provisioning data) to replay proxy 324, which may in turn send and/or store the provisioning data to local file 334. In some embodiments, local file 334 may be implemented in a non-volatile memory, e.g., non-volatile memory 217 as described above with reference to FIG. 2.

As described in the paragraph above, asynchronous replay module 316 may acquire and send the provisioning data to local file 334 (via replay proxy 324) in response to a determination that a provisioning change has occurred, rather than in response to a request from interface control module 332, which may occur, for example, after a reboot of network element 204. As such, the building of the optimized set of provisioning data, the sending of that provisioning data to local file 314, and the storing of that provisioning data in local file 334, may be referred to as occurring asynchronously.

Interface control module 332 may subsequently acquire the provisioning data, if needed, from local file 334 rather than from database manager 312. For example, network interface 204 may reboot after an event such as the power for network interface 204 being cycled off and back on. As described above, local file 334 may be stored in non-volatile memory, and thus may have persisted through the power cycle. Accordingly, during the reboot of network interface 204, interface control module 332 may acquire the provisioning data from local file 334 and use that provisioning data to initialize. Such local acquisition of the provisioning data may provide for a fast and efficient initialization of interface control module 332. Further, local acquisition of provisioning data (as opposed to acquisition from master database 314), for each interface control module 332 in network element 102, may prevent a bottle-neck of provisioning data at database manager 312 when multiple interface control modules 332 within a network element request provisioning data for initialization at the same time (e.g., after power for the entire network element 102 is cycled off and back on).

To ensure that the provisioning data acquired by interface control module 332 from local file 334 is valid, interface control module 332 may check the tag associated with the locally stored provisioning data. For example, interface control module 332 may read the corresponding tag from local file 334 and send a request for a tag check to database manager 312. Database manager 312 may compare the tag from local file 334 to a tag corresponding to the provisioning data in master database 314. If the tag from local file 334 matches the tag from master database 314, database manager 312 may determine that the copy of the provisioning data in local file 334 is valid and matches the provisioning data in master database 314. Database manager 312 may then send a tag-check-good signal back to interface control module 332, indicating that the copy of the provisioning data in local file 334 is valid, and that interface control module 332 may utilize the copy of the provisioning data stored in local file 334 during an initialization process.

Conversely, if the tag from local file 334 does not match the tag from master database 314, database manager 312 may determine that the copy of the provisioning data in local file 334 is not valid and does not match the provisioning data in master database 314. Such a determination may occur, for example, if the provisioning data in master database 314 had been updated based on a user input, but a corresponding copy of the updated provisioning data had not yet been transmitted and stored in local file 334. Database manager 312 may send a tag-check-bad signal back to interface control module 332, indicating that interface control module 332 may not utilize the copy of the provisioning data stored in local file 334 during an initialization process. In such an event, database manager 312 may send the updated provisioning data from master database 314 to interface control module 332 via database manager proxy 322 as described above. Further, asynchronous replay module 316 may, as also described above, send a copy of the updated provisioning data from master database 314 to local file 334 via replay proxy 324. Accordingly, local file 334 may then have a valid copy of the updated provisioning data for future initializations of interface control module 332.

Figure 4:
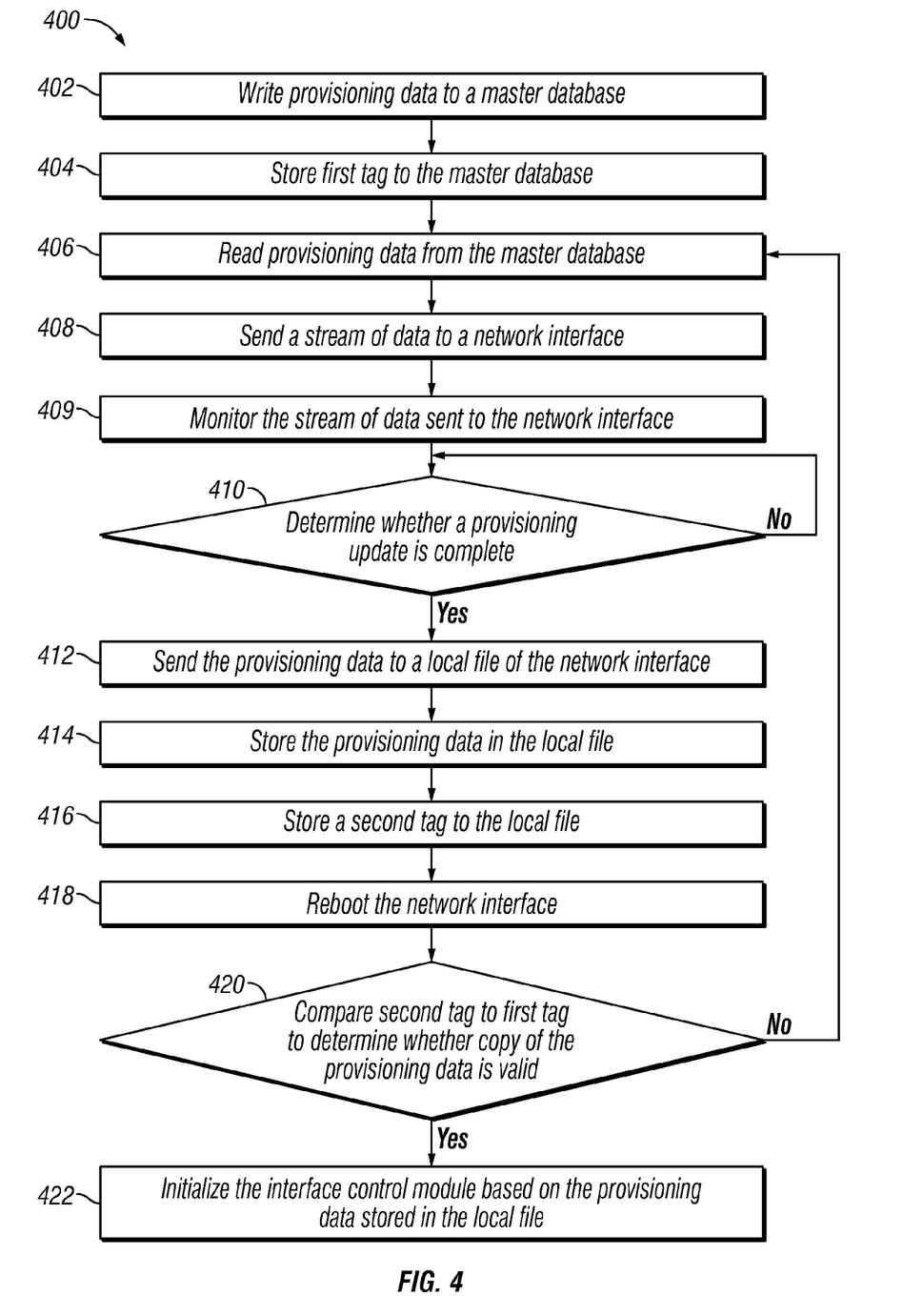
FIG. 4 depicts a flow chart of an example method for provisioning and initializing a network interface of a network element.

FIG. 4 depicts a flow chart of an example method for provisioning and initializing a network interface of a network element.

At step 402, provisioning data may be written to a master database. For example, a user or administrator of network element 102 may input provisioning data into master database 314 via database manager 312. The provisioning data may be periodically updated by the user and/or administrator of network element 102 in order to update the functionality of network element 102. The provisioning data written to master database 314 may include instructions for controlling operations of network interface 204. In some embodiments, the provisioning data may be a portion of a master set of provisioning information which corresponds to multiple interface control module 332 in network element 102.

At step 404, a first tag may be stored to the master database. For example, each time database manager 312 updates the provisioning data stored in master database 314 based on a user input, database manager 312 may also store a tag in master database 314 identifying the updated provisioning data.

At step 406, the provisioning data may be read from the master database. For example, during an initial start-up of network element 102, or after a user update to the provisioning data in master database 314, database manager 312 may read the provisioning data from master database 314. Database manager 312 may then send the provisioning data to database manager proxy 322, which may in turn relay the provisioning data to interface control module 332.

At step 408, a stream of data may be sent to a network interface. For example, during operation of network element 102, a stream of messages may be sent from central controller 310 to interface controller 330 of network interface 204. The stream of messages may include various types of data, for example, data including, but not limited to, retrieval data and/or the provisioning data that was read from master database 314 in step 406.

At step 409, the stream of data sent to the network interface may be monitored. For example, central controller 310 may monitor the stream of messages sent from database manager 312 of central controller 310 to interface control module 332 of interface controller 330. If the stream of messages includes provisioning data, central controller 310 may determine that a provisioning update is being applied to interface control module 332.

At step 410, it may be determined whether a provisioning update for interface control module 332 is complete. For example, when a provisioning update occurs for a particular instance of interface control module 332, a destination identifier for that instance of interface control module 332 may be queued in asynchronous replay module 316. Asynchronous replay module 316 may include a timer corresponding to the destination identifier, and may count the time from the end of a stream of data sent to the destination (i.e., the particular instance of interface control module 332). When the timer reaches a threshold amount of time (e.g., ten seconds, one minute, ten minutes), asynchronous replay module 316 may determine that the stream of messages to the interface control module 332 has ceased, and that the provisioning change may, at least for the time being, be complete, although further provisioning changes may occur at a later time. If the tracked time has not yet reached the threshold, step 410 may repeat by continuing to track the time from the end of the stream of data until that time reaches the threshold.

At step 412, provisioning data may be sent to a local file of a network interface. At step 414, the provisioning data may be stored in the local file. And at step 416, a second tag may be stored in the local file. For example, after asynchronous replay module 316 determines that the provisioning change for a particular interface control module 332 is complete, asynchronous replay module 316 may read master database 314 to acquire the provisioning data for that particular interface control module 332. In some embodiments, asynchronous replay module 316 may filter the provisioning data that is associated with the particular interface control module 332 out of a master set of provisioning information in master database 314 corresponding to all instances of interface control module 332 in network element 102. Asynchronous replay module 316 may send the filtered provisioning data to replay proxy 324, which may in turn send and/or store the provisioning data to local file 334. With a copy of the provisioning data stored locally, interface control module 332 may subsequently acquire provisioning data, if needed, from local file 334 rather than from database manager 312.

At step 418, the network interface may be rebooted. For example, network interface 204 may reboot after an event such as the power for network interface 204 being cycled off and back on.

At step 420, the second tag may be compared to the first tag to determine whether the copy of the provisioning data is valid. For example, during a reboot of network interface 204, interface control module 332 may acquire the provisioning data from local file 334 in order to initialize. To ensure that the copy of the provisioning data acquired by interface control module 332 from local file 334 is valid, interface control module 332 may check the tag associated with the locally stored provisioning data. For example, interface control module 332 may read the second tag from local file 334 and send a request for a tag check to database manager 312. Database manager 312 may compare the tag from the local file to a tag corresponding to the provisioning data stored in master database 314. If the tag from local file 334 (e.g., the second tag) matches the tag from master database 314 (e.g., the first tag), database manager 312 may determine that the copy of the provisioning data in local file 334 is valid and matches the provisioning data in master database 314. Database manager 312 may then send a tag-check-good signal back to interface control module 332, indicating that interface control module 332 may utilize the copy of the provisioning data stored in local file 334 during an initialization process. Method 400 may then proceed to step 422.

Conversely, if the tag from local file 334 (e.g., the second tag) does not match the tag from master database 314 (e.g., the first tag), database manager 312 may determine that the copy of the provisioning data in local file 334 is not valid and does not match the provisioning data in master database 314. Such a determination may occur, for example, if the provisioning data in master database 314 had been updated based on a user input, but a corresponding copy of the updated provisioning data had not yet been transmitted and stored to local file 334. Database manager 312 may send a tag-check-bad signal back to interface control module 332, indicating that interface control module 332 may not utilize the copy of the provisioning data stored in local file 334 during an initialization process. In such an event, method 400 may return to step 406 and proceed with further steps of the method 400 in order for interface control module 332 to acquire valid provisioning data.

At step 422, the interface control module may be initialized based on the copy of the provisioning data stored in the local file. For example, after receiving a tag-check-good signal, interface control module 332 may read the copy of the provisioning data stored in local file 334 and may utilize that provisioning data to initialize. Accordingly, interface control module 332 may then control an operation of network interface 204 based on the copy of the provisioning data stored in local file 334.

Although FIG. 4 discloses a particular number of steps to be taken with respect to method 400, method 400 may be executed with greater or lesser steps than those depicted in FIG. 4. For example, method 400 may be executed without step 402. In addition, although FIG. 4 discloses a certain order of steps to be taken with respect to method 400, the steps comprising method 400 may be completed in any suitable order. For example, step 404 may be executed either before or after step 402.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for initializing a first network interface that serves as an interface between a network element and a transmission medium, the method comprising:
   monitoring a stream of data sent to the first network interface, the first network interface includes a plurality of ports that receive corresponding transmission media and the first network interface includes an interface control module for handling and routing traffic;
   determining that a provisioning update for the first network interface is complete;
   acquiring provisioning data from a database in response to determining that the provisioning update for the first network interface is complete, the provisioning data comprise a portion of a master set of provisioning information stored in a database, the master set of provisioning information corresponding to multiple network interfaces, which include the first network interface;
   filtering the provisioning data based on an identifier for the interface control module;
   sending provisioning data associated with the identifier for the interface control module to a local file of the first network interface;
   storing the provisioning data associated with the identifier for the interface control module in the local file; and initializing the interface control module of the first network interface based on the provisioning data stored in the local file.

2. The method of claim 1, further comprising determining whether the provisioning update is occurring based on whether the stream of data sent to the first network interface comprises provisioning data.

3. The method of claim 1, further comprising:
tracking a time since an end of the stream of data was sent to the first network interface;
wherein the determining that the provisioning update for the first network interface is complete, is based on the tracked time reaching a threshold with no additional stream of data to the first network interface occurring during the tracked time.

4. The method of claim 1, wherein storing the provisioning data in the local file comprises storing the provisioning data to a non-volatile memory.

5. The method of claim 1, further comprising controlling an operation of the first network interface, after initializing the interface control module, based on the provisioning data stored in the local file.

6. The method of claim 1, further comprising:
storing a first tag, corresponding to the provisioning data, to a database; and
storing a second tag, corresponding to the provisioning data, to the local file.

7. The method of claim 6, further comprising comparing the second tag to the first tag to determine whether the provisioning data stored in the local file is valid.

8. The method of claim 1, wherein the initialization of the interface control module of the first network interface based on the provisioning data stored in the local file occurs based in part on a determination that the provisioning data stored in the local file is valid.

9. A network element, comprising:
a first processor configured to access a non-transitory computer readable first memory, wherein the first memory stores a first set of processor-executable instructions that, when executed by the first processor, cause the first processor to:
monitor a stream of data sent to a first network interface that serves as an interface between the network element and a transmission medium, the first network interface includes a plurality of ports that receive corresponding transmission media and the first network interface includes an interface control module for handling and routing traffic;
determine that a provisioning update for the first network interface is complete;
acquire provisioning data from a database in response to a determination that the provisioning update for the first network interface is complete, the provisioning data comprise a portion of a master set of provisioning information stored in a database, the master set of provisioning information corresponding to multiple network interfaces, which include the first network interface;
filter the provisioning data based on an identifier for the interface control module; and
send the provisioning data associated with the identifier for the interface control module to a local file of the first network interface; and
a second processor located at the first network interface and configured to access a non-transitory computer readable second memory, wherein the second memory stores a second set of processor-executable instructions that, when executed by the second processor, cause the second processor to:
store the provisioning data associated with the identifier for the interface control module in the local file; and
initialize the interface control module of the first network interface based on the provisioning data stored in the local file.

10. The network element of claim 9, wherein the first memory further comprises instructions for causing the first processor to determine whether the provisioning update is occurring based on whether the stream of data sent to the first network interface comprises provisioning data.

11. The network element of claim 9, wherein the first memory further comprises instructions for causing the first processor to track a time since an end of the stream of provisioning data was sent to the first network interface, wherein a determination that the provisioning update for the first network interface is complete, is based on the tracked time reaching a threshold with no additional stream of data to the first network interface occurring during the tracked time.

12. The network element of claim 9, wherein:
the second memory comprises a non-volatile memory; and
the local file is implemented in the non-volatile memory.

13. The network element of claim 9, wherein the second memory further comprises instructions for causing the second processor to control an operation of the first network interface, after the initialization of the interface control module, based on the provisioning data stored in the local file.

14. The network element of claim 9, wherein:
the first memory further comprises instructions for causing the first processor to store a first tag, corresponding to the provisioning data, to a database; and
the second memory further comprises instructions for causing the second processor to store a second tag, corresponding to the provisioning data, to the local file.

15. The network element of claim 14, wherein the first memory further comprises instructions for causing the first processor to compare the second tag to the first tag to determine whether the provisioning data stored in the local file is valid.

16. The network element of claim 9, wherein the initialization of the interface control module of the first network interface based on the provisioning data stored in the local file occurs based in part on a determination that the provisioning data stored in the local file is valid.

* * * * *